United States Patent
Huber (10) Patent No.: US 10,328,968 B2
(45) Date of Patent: Jun. 25, 2019

(54) STEERING COLUMN FOR A MOTOR VEHICLE

(71) Applicants: ThyssenKrupp Presta AG, Eschen (LI); ThyssenKrupp AG, Essen (DE)

(72) Inventor: Sebastian Huber, Göfis (AT)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 56 days.

(21) Appl. No.: 15/118,033

(22) PCT Filed: Feb. 10, 2015

(86) PCT No.: PCT/EP2015/052740
§ 371 (c)(1),
(2) Date: Aug. 10, 2016

(87) PCT Pub. No.: WO2015/121245
PCT Pub. Date: Aug. 20, 2015

(65) Prior Publication Data
US 2017/0008550 A1    Jan. 12, 2017

(30) Foreign Application Priority Data
Feb. 11, 2014    (DE) .................. 10 2014 101 631

(51) Int. Cl.
*B62D 1/19*    (2006.01)
*B62D 1/189*    (2006.01)

(52) U.S. Cl.
CPC ............ *B62D 1/195* (2013.01); *B62D 1/189* (2013.01)

(58) Field of Classification Search
CPC ........... B62D 1/195; B62D 1/189; B62D 1/19
See application file for complete search history.

(56) References Cited

U.S. PATENT DOCUMENTS 3,703,106 A    11/1972    Arntson et al.
2004/0000781 A1*    1/2004    Lange ............... B62D 1/195
                                              280/777

(Continued)

FOREIGN PATENT DOCUMENTS

DE    10346442 B3    4/2005
DE    102005052123 B3    1/2007

(Continued)

OTHER PUBLICATIONS

International Search Report for PCT/EP2015/052740 dated Apr. 24, 2015 (dated May 8, 2015).

(Continued)

*Primary Examiner* — James A English
(74) *Attorney, Agent, or Firm* — thyssenkrupp North America, Inc.

(57) ABSTRACT

Steering columns for motor vehicles may comprise a supporting unit, which can be connected to the chassis of the motor vehicle, and an adjusting unit, which may be held at the supporting unit. The adjusting unit may support a steering spindle for transferring a steering motion from a steering wheel to a steerable wheel, wherein the adjusting unit can be shifted with respect to the supporting unit in the event of a crash. An energy absorption device may have a first sliding rail, which can be fixed at the adjusting unit, and a second sliding rail, which can be fixed to the supporting unit. The first and second sliding rails may be guided in contact with one another and, in a crash event, can be shifted with respect to one another in order to absorb energy.

14 Claims, 3 Drawing Sheets

(56) References Cited

U.S. PATENT DOCUMENTS

| | | | |
|---|---|---|---|
| 2008/0229867 A1 | 9/2008 | Waibel et al. | |
| 2011/0115206 A1 | 5/2011 | Sulser et al. | |
| 2012/0266716 A1* | 10/2012 | Sulser | B62D 1/184 74/493 |
| 2013/0068062 A1* | 3/2013 | Kircher | B62D 1/192 74/492 |
| 2017/0137051 A1* | 5/2017 | Sawall | B62D 1/184 |

FOREIGN PATENT DOCUMENTS

| | | |
|---|---|---|
| DE | 102008034807 B3 | 10/2009 |
| DE | 102011015140 A1 | 9/2012 |
| EP | 0849141 A1 | 6/1998 |
| EP | 2307259 A2 | 4/2011 |

OTHER PUBLICATIONS

English language Abstract for DE 10346442 B3 listed above.
English language Abstract for DE 102011015140 A1 listed above.

\* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2015/052740, filed Feb. 10, 2015, which claims priority to German Patent Application No. 102014101631.9 filed Feb. 11, 2014, the entire contents of both of which are incorporated herein by reference.

FIELD

The present disclosure relates to steering columns for vehicles and, more particularly, to adjustable, energy-absorbing steering columns.

BACKGROUND

Steering columns in motor vehicles are known, with which a supporting unit, which can be connected with the chassis and is, for example, in the form of console parts, is provided, and an adjusting unit, which is held at the supporting unit and comprises, for example, an outer sleeve, is provided, a steering spindle being supported rotatably in the adjusting unit. With respect to the supporting unit, the adjusting unit is disposed displaceably, so as to, in the event of a crash, provide flexibility of the steering wheel by means of a corresponding displacement of the adjusting unit with respect to the supporting unit that is connected with the chassis, in order to improve crash behavior. When the adjusting unit is shifted with respect to the supporting unit, crash energy is absorbed over an energy absorption device, different designs being known here, by means of which crash energy can be absorbed in a controlled manner by way of the displacement path of the adjusting unit with respect to the supporting unit For example, a steering column is known from the DE 10 2005 052 123 B3, for which an energy absorbing part, which has an elongated hole and is fixed to the adjusting unit, is provided between the supporting unit and the adjusting unit. A bolt, fixed to a rail and having enlargements, is guided in the elongated hole and, in normal operation, is fixed to the support unit by way of a locking unit at the supporting unit. In the case of a crash, the bolt can move in the elongated hole and, because of the enlargements of the bolt, the energy-absorbing part and, especially, the elongated hole of the energy-absorbing part can deform, so that a controlled energy absorption is attained by way of the displacement path.

An alternative concept is pursued in the DE 10 2008 034 807 B3, in which an adjusting unit is also disposed displayceably here with respect to the supporting unit; the adjusting unit and the supporting unit are not shifted mutually in normal operation; however, in the case of a crash, the adjusting unit shifts with respect to the supporting unit in order to absorb energy. Between an intervention part, which is locked to the supporting unit in normal operation, and a rail, which is fixed to the adjusting unit, a bending strip is provided, which is designed so that, in the event of a crash, a defined displacement of the adjusting unit with respect to the supporting unit absorbs energy due to deformation.

The previously described steering columns for motor vehicles are steering columns, which can be adjusted to fit the position of the steering wheel to the seated position of the driver, wherein at least a longitudinal alignment by shifting the adjusting unit with respect to the supporting unit can be carried out here. The position of the adjusting unit relative to the supporting unit, which is achieved after a corresponding adjusting process, is fixed by an appropriate locking mechanism so that, under normal operating conditions, the adjusted position of the adjusting unit with respect to the supporting unit is fixed. For this purpose, a tension mechanism, for example, is proposed, which acts over a tensioning bolt and at least one arresting element on the rail, which acts as a locking element, so that, in normal operation, the locking element is held immovably in the longitudinal direction of the steering column with respect to the adjusting unit. In the event of a crash, it can be shifted with respect to the adjusting unit with energy absorption, utilizing the energy absorption mechanism accomplished above by way of example.

For example, therefore, the deformation of the elongated hole of the energy-absorbing part or the deformation of the bending wire or bending strip can be specified by the energy-absorbing mechanism in accordance with a specified force-displacement behavior for the absorption of the crash energy over the displacement path for the crash case, since the relative displacement between the supporting unit and the adjusting unit may always be the same and is not changed by adjusting the length of the steering column.

For its development, the energy absorption mechanism described requires at least three parts in the form of an intervention part, a rail and the bolt or the bending strip.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element.

The present disclosure generally concerns steering columns for motor vehicles that may include a supporting unit, which can be connected with the chassis of the motor vehicle; and an adjusting unit, which may be held at the supporting unit and may support a steering spindle that serves to introduce a steering motion from a steering wheel into a steering system for transferring the steering motion to a steerable wheel. In some examples, the adjusting unit can be shifted with respect to the supporting unit in the event of a crash for purposes of absorbing energy.

One example object of the present disclosure is to disclose a steering column for a motor vehicle, which has a simplified structure.

Correspondingly, a steering column for a motor vehicle is proposed, which comprises a supporting unit, which can be connected to the chassis of the motor vehicle, and an adjusting unit which is held at the supporting unit and supports a steering spindle, which serves to introduce a steering motion from a steering wheel into a steering system for transferring the steering motion to a steerable wheel, wherein the adjusting unit can be shifted with respect to the supporting and wherein energy absorption device is disposed between the supporting unit and the adjusting unit in order to absorb energy over the displacement path in the event of a crash. In accordance with the invention, the energy absorption device has a first sliding rail, which is fixed to the adjusting unit, and a second sliding rail, which is fixed to the supporting unit, which are guided next to one another and which, in the event of a crash, can be shifted against one another for absorbing the energy.

In particular, the steering spindle can transfer the steering motion from the steering wheel to the steerable wheel with interposing a steering gear. However, it is also conceivable and possible that the steering motion is scanned sensorially, for example electrically, electronically or magnetically by the steering spindle and fed into a control, which, over a device, carries out the swiveling of the steerable wheel to represent the steering motion. Such systems are known as steer-by-wire.

Owing to the fact that a first sliding rail and a second sliding rail are provided, which can be shifted against one another in the case of a crash with absorption of energy, a further simplification in comparison to the energy absorption mechanism, known from the prior art, can be attained. In particular, due to the provision of the two sliding rails, which are guided along one another, a reliable absorption of energy can be obtained because of the inhibition existing between the two sliding rails, which can be attained, for example, by friction and/or deformation.

Preferably, the first sliding rail has a C-shaped cross-section and the second sliding rail is guided and the first sliding rail. It is particularly preferred if the second sliding rail also has a C-shaped cross-section and one sliding rail is guided in the other. The C-shaped cross-section has two side walls and a base region or a base part. The base part connects the two side walls with one another, so that the C-shaped cross-section is formed. In this way, contact between the sliding rails can be prepared easily in such a manner, that energy absorption is provided at least in the region of the side walls of the C-shaped profile.

In the case of a sliding rail having a C-shaped cross-section, the two sliding rails may be connected either with their respective sidewalls counter to one another in such a manner, that the respective base parts lie on the outside and the two sliding rails correspondingly contact one another essentially only in the region of the side walls, or that the two sliding rails are inserted in one another in the same direction so that the bases as well as the side walls contact one another.

Preferably, one sliding rail is held positively at the other and can be shifted only in the direction of the rails, it being especially preferred if at least one sliding rail has an undercut for holding the other sliding rail. In this way, the two sliding rails are connected undetachably with one another and the two sliding rails remain in their intended position even in the case of an adjustment of an adjustable steering column.

In order to provide an energy absorption by deformation as well as an energy absorption by friction, at least one of the sliding rails advantageously has a cross-section, which varies along the sliding rail, in order to bring about a deformation of at least one of the sliding rails when the sliding rails are shifted against one another. Due to the deformation, bought about in this manner by the displacement of the sliding rails, energy is absorbed when the two sliding owners are shifted against one another, as occurs in the case of a crash.

The variable cross-section can be portrayed especially preferably owing to the fact that at least one sliding rail has a wedge angle along the sliding rail. When the sliding rails are shifted against one another, a wedge action is produced between the sliding rails by the wedge angle and results in the deformation of at least one of the sliding rails. Energy is absorbed correspondingly by the deformation.

A particularly advantageous combination of high friction and wedge action is attained if the two sliding rails have an identical wedge angle. With that, the sliding rails are in contact with one another essentially over their whole surface, so that a high friction is produced reliably and, furthermore, the deformation of at least one of the sliding rails is made possible over the whole of the contact area between the sliding rails.

The wedge angle, by which a tapering of the sliding rail or an expansion of the sliding rail in the displacement direction is formed in the case of a crash, can be equalized with the respective, desired force-displacement path behavior, so that a force-displacement path behavior or energy absorption behavior of the steering column, which is optimum for the respective application, can be attained.

An energy absorption device, which is particularly simple and can be produced economically, is attained if the first sliding rail and/or the second sliding rail are/is formed as a shaped sheet metal part. The two sliding rails may be provided as bent sheet metal strips. Alternatively, one of the sliding rails may also be constructed as a sintered part. This sliding rail, which is formed as a sintered part, is then preferably formed not as a C profile, but rather as a full profile and guided in the other, preferably C-shaped sliding rail.

It is particularly preferred if the steering column is formed as an adjustable steering column, the position of the adjusting unit of which can be varied with respect to the supporting unit under normal operating conditions. In order to achieve this, the second sliding rail can be fixed by a clamping mechanism to the supporting unit in order to make it possible, in the open state of the clamping mechanism, to adjust the length of the adjusting unit with respect to the supporting unit and, in a locked position of the clamping mechanism, prevent displacement of the adjusting unit with respect to the supporting unit under normal operating conditions.

A connection of the first sliding rail with the outer sleeve, which can be produced reliably and economically, can be attained owing to the fact that the first sliding rail at the outer sleeve of the adjusting unit is connected non-detachably and positively, preferably by clinching. On the one hand, a nondestructive fastening of the sliding rail to the outer sleeve of the adjusting unit is achieved by these means and, on the other; a cost-effective fastening is attained by the clinching without any welding processes.

In the following, preferred examples are described by means of the Figures. Identical, similar or equivalent elements in the different Figures have identical reference numbers and a repeated description of these elements is partly omitted in the following description, in order to avoid redundancies.

In FIGS. 1 to 9, different representations, different states and different components of an adjustable steering column 1 are shown in a first example. The following description initially refers to this example.

Figure 1:
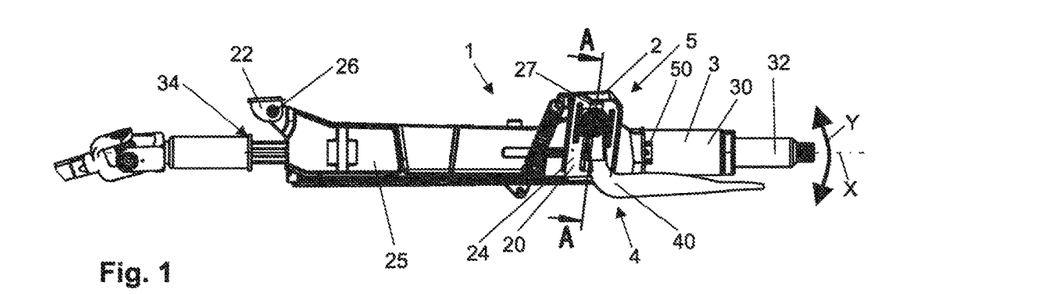
FIG. 1 is a diagrammatic side view of a first example adjustable steering column.
Figure 2:
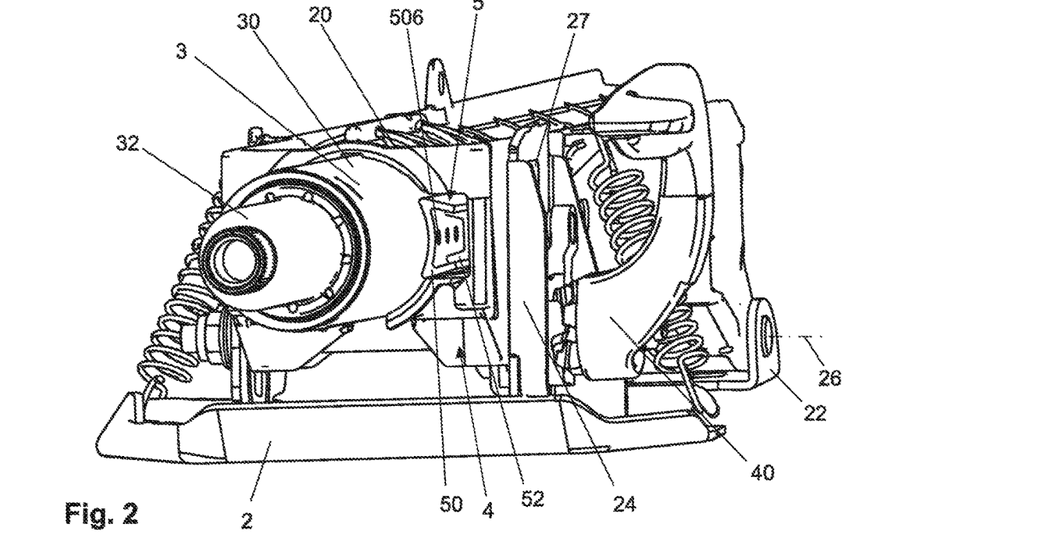
FIG. 2 is a diagrammatic perspective view from below of the example adjustable steering column of FIG. 1.

The steering column 1 comprises a supporting unit 2, which can be connected to the chassis of the respective motor vehicle. In the example shown, the supporting unit 2 has a first console part 20 and a second console part 22, which are connected with one another and by means of which the supporting unit 2 can be attached to the chassis of the motor vehicle.

An adjusting unit 3 is provided, which has an outer sleeve 30 and which accommodates a steering spindle 32, which is mounted rotatably. By means of the steering spindle 32, which extends along its steering spindle axis X, a torque, which is introduced by a driver by way of a steering wheel, which is not shown here and is mounted on the steering spindle 32, as a steering instruction, can be transferred to a pinion, which is not shown here and which meshes with a tie rod, which is not shown here and which then, in turn, transfers the specified steering angle over tie rods to the steerable wheels of the motor vehicle.

The supporting unit furthermore comprises sidewalls 24, which are connected with the rear console part 20 and between which the adjusting unit 3 is held displaceably. Furthermore, for transferring the torque from the steering spindle 32 to the downstream components in the different positions, a telescope mechanism 34 is provided, which enables the adjusting unit 3 to be displaced with respect to the supporting unit 2 while, at the same time, transferring the torque. In the example shown, the adjusting unit 3 is held correspondingly along the steering spindle axis X displaceably in the supporting unit 2.

The adjusting unit 3 can be shifted along the steering spindle axis X with respect to the supporting unit 2, in order to adapt the position of the steering wheel to the seated position of the respective driver of the motor vehicle. In this way, the ergonomic can be improved for the driver and the safety while driving the motor vehicle can therefore be increased.

The position of the steering wheel, set by the driver, and, with that, the position of the adjusting unit 3 with respect to the supporting unit 2 is locked over a clamping mechanism 4. Among other things, the clamping mechanism 4 comprises a thrust bearing 46, a cam mechanism 45 comprising a cam, which can be twisted with respect to the counter-cam and a clamping lever 40, by means of which the clamping mechanism 4 and the cams of the cam mechanism 45 can be twisted against one another, as a result of which the clamping mechanism can be actuated. The clamping axis 42 passes through openings 27 in the sidewalls 24 of the rear console part 20. When the clamping mechanism 4 is clamped, the sidewalls 24 are pressed against the adjusting unit 3, so that locking is achieved. In an open position of the clamping lever 40, which is shown, for example, in FIG. 5, the clamping mechanism 4 is opened, in order to be able to adjust the position of the adjusting unit 3 with respect to the supporting unit 2 along the steering spindle axis X. After the desired position is found, the clamping lever 40 is then moved into the locking position, which can be seen, for example, in FIG. 4. In a locking position of the clamping lever 40, the position of the adjusting unit 3 with respect to the supporting unit 2 cannot be changed in the normal operation of the vehicle, so that a comfortable and safe operation of the motor vehicle is made possible. In particular, the locking mechanism is designed so that, in normal operation with the clamping mechanism 4 locked, the adjusting unit 3 cannot shifted with respect to the supporting unit 2 even when a driver supports himself at or pulls on the steering wheel while getting in or out of the motor vehicle.

In the example shown here, the displayceability along the steering spindle axis X, as well as a height adjustment of the steering spindle 32 along the height direction Y is provided. For this purpose, a swiveling lever 25 is provided, which takes up the adjusting unit 3 and can swivel about a swivel axis 26 and fixed to the front console part 22. Elongated holes 27, which are penetrated by the clamping axis and enable a movement of the clamping axis and in the height direction Y when the clamping system is open, are provided in the side walls of the rear console part 20. When the clamping mechanism 4 is closed, the sidewalls 24 are pressed against the swiveling lever 25 and the swiveling lever 25 is pressed against the adjusting unit 3, so that the movement in the direction of the steering spindle axis X (=longitudinal direction) and in the height direction Y is blocked. Comparable clamping systems are known in the art, for example, in the initially mentioned DE 10 2005 052 123 B3.

In order to permit shifting of the adjusting unit 3 relative to the supporting unit 2 in the direction of the steering spindle axis X in the event of a crash and, at the same time, make a controlled absorption of energy possible, an energy absorption device 5 is provided between the supporting unit 2 and the adjusting unit 3, by means of which a decay of crash energy, specified over the displacement path can be achieved. In the case of a crash, this is particularly of importance if the energy absorption effect of an airbag, disposed in the steering wheel, has already been consumed and the driver then strikes the steering wheel. Further crash energy can be reduced by the controlled moving back of the steering wheel over the displacement path.

The energy absorbing device 5 has a first sliding rail 50, which is fixed to the adjusting unit 34. Furthermore, a second sliding rail 52 is provided, which is fixed with respect to the supporting unit 2. As shown, for example, in FIG. 2, the first sliding rail 50 and the second sliding rail 52 are passed very close to one another in the rail direction. In the example shown, the second sliding over 52 is guided in the first sliding rail 50 so that the two sliding rails 50, 52 can be shifted counter to one another in the event of a crash.

The first sliding rail 50 and the second sliding rail 52 are connected directly with one another and are prepared to absorb the energy. Further parts, as known from the prior art, are not necessary for the development of the proposed energy absorption device 5. Rather, as described in the following, the energy absorption takes place only through the two sliding rails 50, 52, which are guided next to one another.

The first sliding rail 50 is connected to the adjusting unit 3 by an indissoluble connection, for example, by welding, by riveting or by clinching, which is particularly preferred. With that, the first sliding rail 50 is fixed indissolubly to the adjusting unit 3.

In the example shown, the second sliding rail 52 is fixed by way of the clamping mechanism 4 in the locking position of the clamping lever 42 at the supporting unit 2. On the other hand, in the open position of the clamping lever 40, the second sliding rail 52 is not fixed to the supporting unit 2 and, instead, can be displaced relative to the latter.

Figure 3:
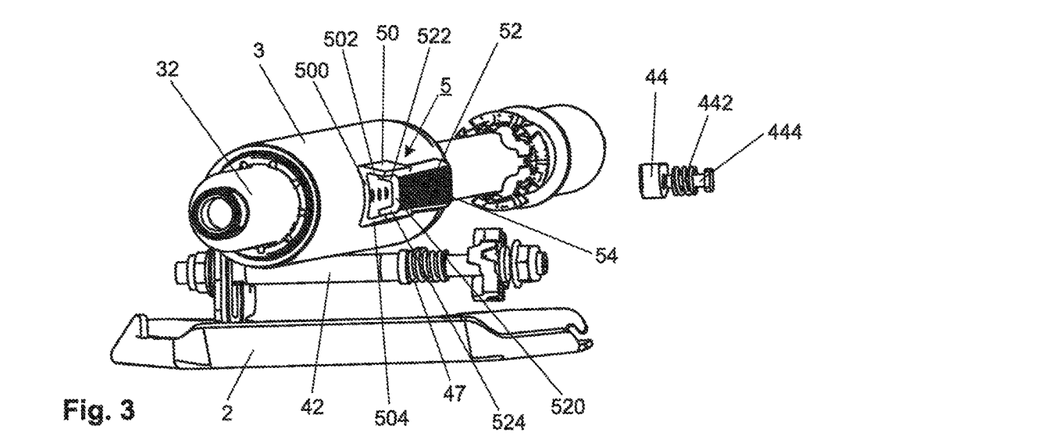
FIG. 3 is a perspective view of some example components of the example adjustable steering column of FIGS. 1-2.
Figure 4:
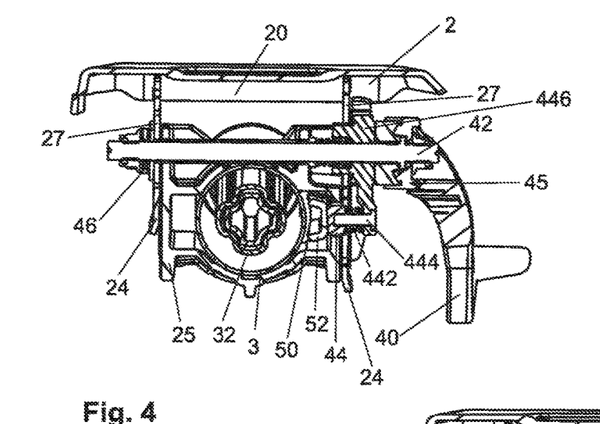
FIG. 4 is a diagrammatic sectional view taken across line A-A of FIG. 1 of the example adjustable steering column in a locked position.

In order to achieve this, the second sliding rail, as can be seen in FIG. 3, is provided with toothing 54, which enables the clamping mechanism 4 to fix the second sliding rail 52 with respect to the supporting unit 2 by way of a mechanism, which is described in the following, in order to hold the adjusting unit 3 with respect to the supporting unit 2 in this way in normal operation in the position selected by the driver.

For this, the clamping mechanism 4 has a clamping lever 40, which acts on a clamping axis, which, in turn, can move an arresting element 44 between the locking position and an open position. The arresting mechanism has a toothing 440, which can engage the toothing 54 of the second sliding rail 52.

Figure 5:
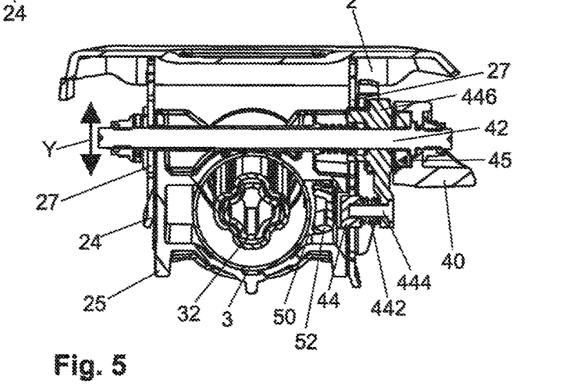
FIG. 5 is a diagrammatic sectional view taken across line A-A of FIG. 1 of the example adjustable steering column in an open position wherein a length adjustment is possible.
Figure 6:
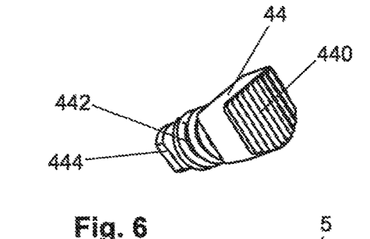
FIG. 6 is a diagrammatic perspective view of an example locking element of a steering column.
Figure 7:
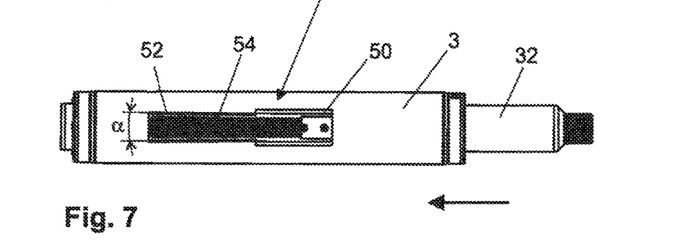
FIG. 7 is a diagrammatic side view of an example adjusting unit with a first and a second sliding rail.

In the open position of the clamping lever 40, the toothing 440 of the arresting element 44 is lifted out of the toothing 54 of the second sliding over 52, as shown, for example, in FIG. 5. In this open position, the second sliding rail 52 can be shifted correspondingly with respect to the supporting unit 2, in order to enable the position of the adjusting unit 3 to be shifted with respect to the supporting unit 2. When the clamping mechanism 4 is opened by appropriately actuating the clamping lever 40, the clamping axis 42 and the arresting element 44, which is connected therewith by way of the transfer element 446, are reliably bought into the open position by a return spring 47, so that the adjusting unit 3 can be adjusted with respect to the supporting unit 2 comfortably without getting caught. The arresting element 44 is connected by means of a bolt 444 by way of a transfer element 446 with the clamping axis 42 in such a manner, that the movement of the arresting element, applied by way of the clamping lever 40, can be transferred to the arresting element 44.

In the locking position of the clamping lever 40, the toothing 440 of the arresting element 44 engages the toothing 54 of the second sliding over 52 in such a manner, that the second sliding over 52 is fixed with respect to the supporting element 2. This situation is shown, for example, in FIG. 4. By pressing the arresting element 44 against the second sliding rail 52, the latter is furthermore pressed against the first sliding rail 50 in such a manner, that a shifting of the first sliding rail 50 with respect to the second sliding rail 52 and, with that, of the adjusting unit 3 with respect to the supporting unit 2 cannot take place in normal operation. With the preload spring 442, the arresting element 44 is preloaded in the direction of the toothing engagement, so that a reliable toothing engagement is ensured no later than after a small adjustment path.

In this way, the position of the adjusting unit 3 can be shifted with respect to the supporting unit 2 along the steering spindle axis X and in the height direction Y when the clamping lever 40 is in the open position and, when the clamping lever 40 is in the locked position, the adjusting unit 3 is arrested with respect to the supporting unit 2 owing to the fact that the toothing 440 of the arresting element 44 engages the toothing 54 of the second sliding rail 52, which therewith fixes the supporting unit 2.

the first sliding rail 50 and the second sliding rail 52 are connected with one another so that they cannot be shifted with respect to one another in a normal operation. This may be achieved, for example, by providing appropriate friction in combination with an appropriate contacting force between the first sliding rail 50 and the second sliding rail 52. In order to achieve this, the sliding rails preferably have the geometry described in the following.

The first sliding rail 50, as shown, for example, in FIGS. 2 and 3, essentially has a C-shaped cross-section. In particular, a base 500 is provided, adjoining which on both sides there are sidewalls 502, 504. The base 500 and the two side walls 502, 504 result in a profile, which is essentially C-shaped in cross-section. Preferably, the two sidewalls 502, 504 are not parallel to one another; instead, in the example shown, they are disposed of an angle 180° to one another, in order to form an undercut in this way, in which the second sliding rail 52 can be held.

The second sliding rail 52 also has a base 520 as well as sidewalls 522, 524, so that the second sliding rail 52 also forms a cross-section, which is essentially C-shaped.

The first sliding rail 50 and the second sliding rail 52 are guided in one another, so that they can be shifted against one another along the direction of the rails by applying a specified force. Since the first sliding rail 50 with the undercut formed by the not parallel sidewalls 502, 504, the second sliding rail 52 preferably also has sidewalls 522, 524 which are not parallel to one another and which are constructed so that they are essentially in full contact with the side walls 502, 504 of the first sliding rail 50. Due to the undercut, which is formed in this way, the second sliding rail 52 is held at the first sliding rail 50 and the two rails can be shifted against one another only in the direction in which they extend.

Other possibilities for a positive connection between the first sliding over 50 and the second sliding over 52 are also conceivable, for example, by providing a groove in one sliding rail and a corresponding projection, which is guided in the groove, in the other sliding rail. It is advantageous here to guide the two sliding rails against each other, so that they can be shifted against one another in the rail direction, but, at the same time, remain connected to one another.

The first sliding rail 50 with its C-shaped cross-section and the second sliding rail 52 with its C shaped cross-section are inserted in opposing directions in one another, so that essentially only the side walls 502, 504 and 522, 524 are in contact with one another On the other hand, the base 500 of the first sliding rail 50 and the base 520 of the second sliding over 52 do not contact one another.

The first sliding rail 50 and the second sliding rail 52 preferably are designed so that they already have a relatively high friction against one another, so that fixing the adjusting unit 3 with respect to the supporting unit 2 can already suffice in normal operation due to the fixing of the second sliding rail 52 at the supporting unit 2 by way of the arresting element 44, in order to hold the position of the adjusting unit 3 reliably with respect to the supporting unit 2. The static friction is increased further by pressing the second sliding rail 52 against the first sliding rail 50 by way of the clamping mechanism 4, so that appropriate locking of the sliding rails 50, 52 against one another can also be attained here by adjusting the contacting pressure. For the steering column 1, illustrated in FIGS. 1 to 5, the main fixing force for securing the position of the adjusting unit 3 with respect to the supporting unit 2 in the locked state of the clamping mechanism 4 is applied by the friction between sidewalls of the supporting unit 2 and of the adjusting unit 3.

The absorption of energy in the case of a crash is achieved by the friction of the sliding rails 50, 52 against one another if the two sliding rails have a constant cross-section over their longitudinal extent and the side walls 502, 504 of the first sliding rail 50 are aligned in each case parallel to the side walls 522, 524 of the second sliding rail 52. The surfaces of the side walls 502, 504, 522, 524 can be treated appropriately and/or the materials can be selected, so that the desired friction and, with that, the desired energy absorption will be attained.

The first sliding rail 50 is connected with the outer sleeve 30 of the adjusting unit 3 preferably by means of a positive, irremovable connection. In the example shown, connecting regions 506 are shown in the base 500, which are formed by means of clinching (for example by the Tox method). Clinching makes a cost effective and reliable connection possible, for which the material properties of the first sliding rail 50 as well as of the outer sleeve 30 essentially remain unchanged because of the absence of temperature stresses. By these means, the strength of the system as a whole can be improved even further in comparison to the use of a positive connection by welding or soldering.

Preferably, the first sliding rail 50 may be provided in the form of a bent sheet metal part, so that clinching can be carried out particularly easily.

Figure 13:
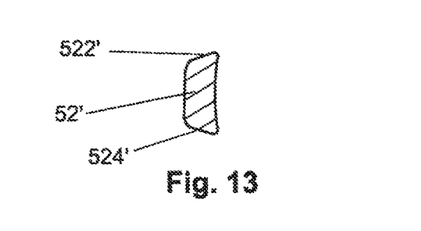
FIG. 13 is a sectional view of another example second sliding rail.

The second sliding rail 52 can also be constructed as a shaped sheet metal part or as a sintered part. FIG. 13 illustrates the preferred embodiment of the sliding rail 52 in the version of a shaped sintered part The two side walls 522' and 524' form the boundary of a full profile, which has a C-shaped outer contour when viewed in cross-section.

Aside from an absorbing energy by friction, as already described above, at least one of the sliding rails 50, 52 may also, furthermore preferably, taper or expand in the direction of the rails in order to apply a wedge effect on the respectively other sliding rail 52, 50 during a displacement. In that case, when the sliding notes 50, 52 are shifted against one another, a deformation of at least one of the two sliding rails 50, 52 is correspondingly caused during the displacement. Crash energy can correspondingly be absorbed in a controlled manner by the continuous deformation, which is brought about in this manner over the displacement path.

Aside from a simple widening or tapering of at least one of the two sliding rails, any other changes in the profile of the sliding rails 50, 52 undertaken over the extent of the sliding rails may also be made, in order to achieve a corresponding absorption affect over the displacement path.

In the example, shown in FIGS. 1 to 9, the second sliding rail 52 is constructed here so that its cross-section expands in the direction of the rails. Moreover, the second sliding rail 52 is oriented so that it expands in the direction, in which a displacement of the first sliding rail 50 with respect to the second sliding rail 52 takes place in the event of a crash. The enlargement correspondingly also leads to a wedge angle α, which can be seen particularly well in FIG. 7. The cross-section of the second sliding rail 52 enlarges, so that, in the event of a shift of the adjusting unit 3 in the direction of the arrow in FIG. 7 with respect to the second sliding rail 52, which is fastened to the supporting unit 2 and is not shown, the first sliding rail 50 is deformed, namely by being enlarged. Crash energy is absorbed correspondingly by this deformation of the first sliding rail 50, when it is shifted relative to the second sliding rail 52.

The energy absorption device 5 shown accordingly absorbs energy not only by friction between the first sliding rail 50 and the second sliding rail 52, but also by a deformation of the sliding rails 50, 52, when they are shifted against one another. If the second sliding rail 52 consists of a sintered material, the deformation takes place only at the first sliding rail 50. If both sliding rails 50, 52 are produced from a sheet metal material, they may both be deformed in the event of a crash. The effect can be adjusted to the desired value by the selection of the materials.

In this way, a particularly simple and reliable absorption of crash energy is possible, since it is only necessary to provide two sliding rails 50, 52, which can be shifted against one another in the event of a crash and can be produced as simple sheet metal parts or as sintered parts. Further components, such as those shown in the prior art, are not required for providing the energy absorption device.

With that, the energy absorption behavior of the energy absorption device 5 can be adjusted reliably, infinitely variably and finely by adjusting the wedge angle α and, with that, adapted easily to the respective application.

Figure 8:
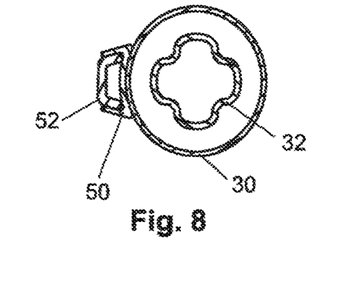
FIG. 8 is a diagrammatic sectional view of the example adjusting unit of FIG. 7.
Figure 9:
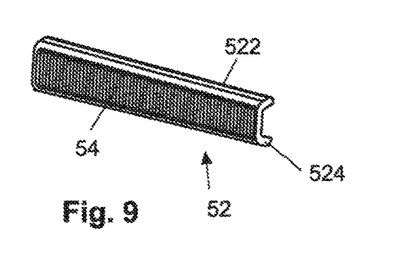
FIG. 9 is a diagrammatic perspective view of an example sliding rail with a wedge angle.

In FIG. 8, this construction of the two sliding rails 50, 52 is shown in a diagrammatic sectional representation. FIG. 9 shows the second sliding rail 52 in a perspective, diagrammatic representation, which also shows the cross-section changing over the extent of the sliding rail 52.

Figure 10:
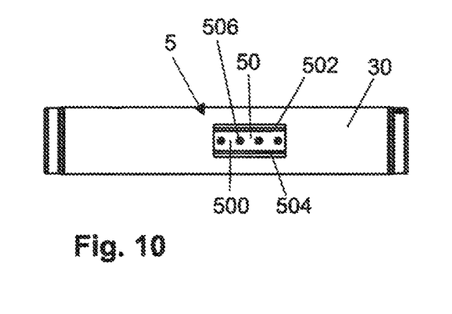
FIG. 10 is a diagrammatic side view of another example adjusting unit with an example sliding rail fixed to the adjusting unit.

An adjusting unit 3 with a first sliding rail 50, which has two side walls 502, 504 as well as a base 500, is shown in FIG. 10. The profile of the first sliding rail 50 does not change over the longitudinal extent of sliding rail 50 and, in particular, a wedge angle also is not provided. With that, in the event of a crash, the sidewalls 502, 504 of this first sliding rail 50 can be expanded as an energy absorption device 5 by using a corresponding second sliding rail 52, as is shown, by way of example, in FIG. 9, so that energy absorption, which exceeds that due strictly to friction, can be attained by the corresponding deformation energy.

Figure 11:
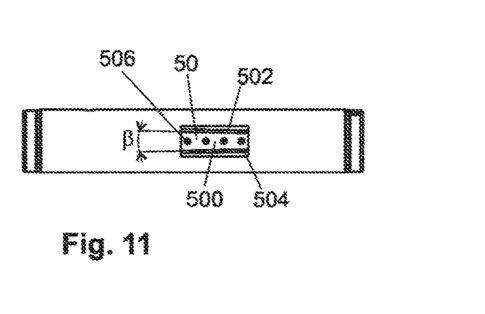
FIG. 11 is a diagrammatic side view of still another example adjusting unit.

FIG. 11 shows an alternative example of a first sliding rail 50, which is fastened to the adjusting unit 3 and has a wedge angle β. Correspondingly, a second sliding rail, which either also is wedge-shaped as, for example, the second sliding rail 52 shown by way of example in FIG. 9, can be inserted into this first sliding rail 50 as shown in FIG. 11 or a sliding rail, which has parallel side walls, which then are pressed together in the second sliding rail shown in FIG. 11. Here also, in the event of a crash, there is deformation of the sidewalls of the sliding rails 50, 52 in the event of a crash, so that energy is absorbed by way of the deformation energy.

Wedge angles α and β ranging from 1° to 5° are to be preferred according to experimental results.

Changes in the cross-section, other than the linear change in cross-section shown here, are also conceivable. For example, a progressive expansion in the cross-section may be provided in order to achieve a progressive increase in the energy absorption towards the end of the shifting path and, correspondingly, at the end of the displacement path, in order to make the transition to blocking the displacement less abrupt and to create correspondingly a harmonic transition.

Figure 12:
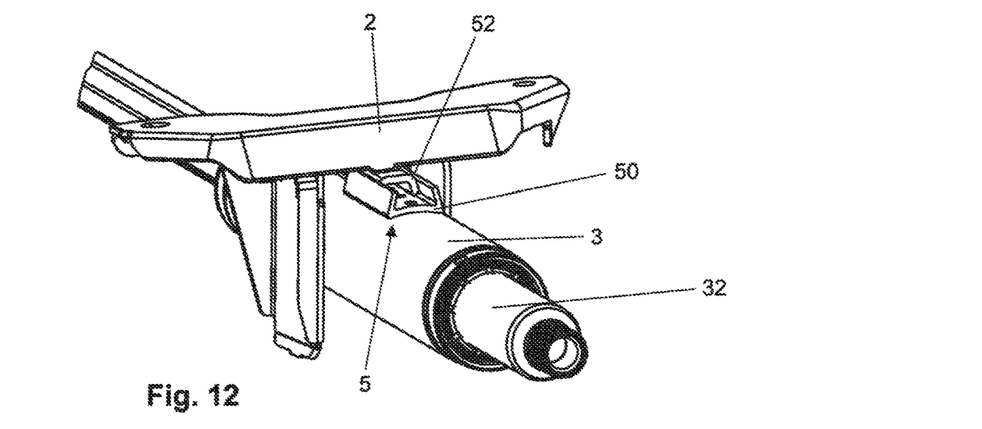
FIG. 12 is a diagrammatic perspective view of another example steering column that does not necessarily provide length adjustment.

FIG. 12 shows a further embodiment of a steering column 1, wherein the longitudinal position of the adjusting unit 3 is not adjustable with respect to the supporting unit 2 in the normal operation and, instead, is disposed in a fixed position.

By means of an energy absorption device 5, which, in turn, comprises a first sliding rail 50, which is constructed in the manner already described above and fixed to the adjusting unit 3, as well as a second sliding rail 52, which is fixed to the supporting unit 2, crash energy can be absorbed in the event of a crash by shifting the adjusting unit 3 with respect to the supporting unit 2.

Alternatively to the orientation of the alignment of the first sliding rail 50 shown, by way of example, in FIGS. 2 and 3, with respect to the second sliding rail 52 in an opposite alignment with respect to the C profile, the first sliding rail 50 and the second sliding over 52 may also be inserted in one another in the same direction so that the open ends of the side walls point in the same direction and the bases 500, 520 also contact one another correspondingly.

Furthermore, it is not necessary that the second sliding rail 52 runs within the first sliding rail 50 and, instead, the sliding rails can also be disposed in the reverse direction, namely in that the second sliding rail 52 runs outside of the first sliding rail 50. A correspondingly advantageous undercut would then correspondingly be constructed so that in this case also the two sliding rails cannot be detached from one another and, instead, can be shifted only in the rail direction.

In so far as is applicable, all individual features, which are presented in the individual examples, can be combined with one another and/or exchanged, without leaving the scope of the invention.

What is claimed is:

1. A steering column for a motor vehicle comprising:
    a supporting unit that is connectable to a chassis of the motor vehicle;
    an adjusting unit that is held at the supporting unit and is shiftable relative to the supporting unit in a crash event;
    a steering spindle supported by the supporting unit, the steering spindle for introducing a steering motion from a steering wheel into a steering system for transferring the steering motion to a steerable wheel; and
    an energy absorption device disposed between the supporting unit and the adjusting unit for absorbing energy over a displacement path, wherein the energy absorption device comprises:
        a first sliding rail that includes a base that is fixed to the adjusting unit, and a pair of spaced sidewalls extending away from the base, and
        a second sliding rail that includes a base that is fixed to the supporting unit, and a pair of spaced sidewalls extending away from the base, wherein the first and second sliding rails are guided next to one another and are shiftable against one another,
        wherein the pair of sidewalls of one of the first and second sliding rails converge in a direction away from the base thereof, and the pair of spaced sidewalls of the other of the first and second sliding rail are nonparallel so as to engage complementarily with the pair of spaced sidewalls of the one of the first and second sliding rails, and
        wherein the first and second sliding rails are configured to interact directly with each other to absorb energy by one or both of frictional interaction of the first and second sliding rails and deformation of the first and second sliding rails.

2. The steering column of claim 1 wherein the first sliding rail includes a C-shaped cross-section and the second sliding rail includes a C-shaped cross-section, wherein either the first sliding rail is guided in the second sliding rail or the second sliding rail is guided in the first sliding rail.

3. The steering column of claim 1 wherein at least one of the first or second sliding rails comprises an undercut for holding the other sliding rail.

4. The steering column of claim 1 wherein at least one of the first or second sliding rails has a cross-section that varies, which allows at least one of the first or second sliding rails to deform when the first and second sliding rails are shifted against one another.

5. The steering column of claim 4 wherein at least one of the first or second sliding rails comprises a wedge angle along the sliding rail.

6. The steering column of claim 5 wherein the first and second sliding rails have the same wedge angle.

7. The steering column of claim 1 at least one of the first or second sliding rails is a shaped sheet metal part.

8. The steering column of claim 1 wherein under normal operation a position of the adjusting unit is shiftable with respect to a position of the supporting unit.

9. The steering column of claim 8 further comprising a clamping mechanism, wherein the second sliding rail is fixable over the clamping mechanism to the supporting unit to permit adjustment of a length of the adjusting unit in an open state of the clamping mechanism, wherein under normal operation with the clamping mechanism in a locked position shifting of the adjusting unit relative to the supporting unit is prevented.

10. The steering column of claim 1 wherein the first sliding rail is not detachable from and is positively connected with an outer sleeve of the adjusting unit.

11. The steering column of claim 10 wherein the first sliding rail is positively connected with the outer sleeve of the adjusting unit by way of clinching.

12. The steering column of claim 1, wherein the first and second sliding rails are connected undetachably with one another.

13. The steering column of claim 12, wherein the first and second sliding rails contact one another essentially along only adjacent respective ones of the pair of spaced side walls of the first and second sliding rails.

14. The steering column of claim 12, wherein the first and second sliding rails are connected undetachably with one another by interconnection of the pair of spaced side walls of each of the first sliding rail and the second sliding rail.

* * * * *